(12) United States Patent
Zhang et al.

(10) Patent No.: US 12,349,711 B2
(45) Date of Patent: Jul. 8, 2025

(54) SHELF STABLE POWDERED COMPOSITION

(71) Applicant: FIRMENICH SA, Satigny (CH)

(72) Inventors: Jian Zhang, Plainsboro, NY (US);
Rutger Van Sleeuwen, Plainsboro, NY (US); Amanda Schober, Plainsboro, NY (US); Brian MacDougall, Plainsboro, NY (US); Fei Frank Zhang, Shanghai (CN); Pierre-Etienne Bouquerand, Meyrin (CH)

(73) Assignee: FIRMENICH SA, Satigny (CH)

( * ) Notice: Subject to any disclaimer, the term of this patent is extended or adjusted under 35 U.S.C. 154(b) by 425 days.

(21) Appl. No.: 16/772,334

(22) PCT Filed: Feb. 22, 2019

(86) PCT No.: PCT/EP2019/054497
§ 371 (c)(1),
(2) Date: Jun. 12, 2020

(87) PCT Pub. No.: WO2019/162475
PCT Pub. Date: Aug. 29, 2019

(65) Prior Publication Data
US 2021/0076720 A1    Mar. 18, 2021

Related U.S. Application Data

(60) Provisional application No. 62/634,246, filed on Feb. 23, 2018.

(30) Foreign Application Priority Data

Apr. 13, 2018  (EP) .................................... 18167299

(51) Int. Cl.
*A23L 27/00* (2016.01)
*A23L 27/12* (2016.01)
(Continued)

(52) U.S. Cl.
CPC ............... *A23L 27/72* (2016.08); *A23L 27/13* (2016.08); *A23L 29/10* (2016.08); *A23L 29/30* (2016.08); *A23V 2002/00* (2013.01)

(58) Field of Classification Search
CPC .......... A23L 27/72; A23L 29/10; A23L 29/30; A23L 27/13; A23V 2002/00
See application file for complete search history.

(56) References Cited

U.S. PATENT DOCUMENTS 8,779,009 B2    7/2014  Williams et al.
2011/0091598 A1  4/2011  Hsu et al.
(Continued)

FOREIGN PATENT DOCUMENTS

JP    2009521214 A    6/2009
JP    2010509332 A    3/2010
(Continued)

OTHER PUBLICATIONS

International Search Report and Written Opinion for corresponding PCT/EP2019/054497, mailed Mar. 29, 2019, 10 pages.

*Primary Examiner* — Katherine D Leblanc
(74) *Attorney, Agent, or Firm* — Armstrong Teasdale LLP

(57) ABSTRACT

Described herein is a shelf stable powdered composition. More particularly, the composition includes a natural emulsifier, a carrier including inulin having a degree of polymerization equal or less than 15, and an active ingredient including a flavor or a perfume. Also described herein are a process for preparing such a composition and consumer products containing such a composition.

13 Claims, 4 Drawing Sheets

(51) Int. Cl.
    *A23L 29/10*     (2016.01)
    *A23L 29/30*     (2016.01)

(56)                 References Cited

U.S. PATENT DOCUMENTS

| | | |
|---|---|---|
| 2011/0136732 A1 | 6/2011 | Boehm et al. |
| 2011/0256199 A1 | 10/2011 | Zasypkin |
| 2012/0010074 A1 | 1/2012 | Koltzenburg et al. |
| 2012/0041188 A1* | 2/2012 | Laufenberg ......... C08B 37/0054 |
| | | 536/123.1 |
| 2012/0231122 A1* | 9/2012 | Tran ........................ A23L 29/10 |
| | | 426/654 |
| 2013/0243851 A1* | 9/2013 | Zasypkin ................ A23L 27/72 |
| | | 426/651 |

FOREIGN PATENT DOCUMENTS

| | | | | |
|---|---|---|---|---|
| JP | 2010120945 A | 6/2010 | | |
| JP | 2012520843 A | 9/2012 | | |
| JP | 2013102746 A | 5/2013 | | |
| JP | 2014140324 A | 8/2014 | | |
| JP | 2017535281 A | 11/2017 | | |
| WO | WO-0205667 A2 * | 1/2002 | ............. | A23L 33/15 |
| WO | 2012125142 A1 | 9/2012 | | |

\* cited by examiner

US 12,349,711 B2

SHELF STABLE POWDERED COMPOSITION

CROSS-REFERENCE TO RELATED APPLICATIONS

This application is a U.S. National Phase Application of International Patent Application No. PCT/EP2019/054497, filed Feb. 22, 2019, which claims the benefit of priority to U.S. Provisional Patent Application No. 62/634,246, filed Feb. 23, 2018, and to European Patent Application Ser. No. 18/167,299.9, filed Apr. 13, 2018, the entire contents of each of which are hereby incorporated by reference herein.

TECHNICAL FIELD

The technical field of the present invention relates to a shelf stable powdered composition. More particularly, it relates to a composition comprising a natural emulsifier, a carrier comprising inulin having a degree of polymerization equal or less than 15 and an active ingredient comprising a flavor or a perfume. Process for preparing said composition and consumer products containing said composition are also objects of the invention.

BACKGROUND

The consumer demand for natural delivery systems is more and more important and is driving therefore the development of new delivery systems.

Dried particles are commonly prepared from a liquid emulsion that is then dried via different methods (e.g., spray drying, extrusion, fluidizing bed drying, etc.). Most of the emulsions comprise flavours or fragrances, a carrier and an emulsifier. One of the problems faced by flavor and perfumery industries lies in the oxidation of active ingredients when oxidizable flavors or fragrances are encapsulated. This oxidation creates off-flavors or off-notes unpleasant for the consumer. Furthermore, this oxidation phenomenon leads to difficult prediction of the shelf life of the final product upon storage.

For example for citrus flavours, which are especially sensitive to oxygen, the shelf life of spray dried citrus flavor typically does not exceed 12 months.

Indeed, it is known that limonene is present as the main compound in many citrus oils, especially orange oil. When exposed to oxygen, limonene reacts to yield epoxides, alcohols, and ketones which are responsible for the off-notes in the flavor oil Limonene degrades to limonene oxide (also called limonene epoxides) which further degrades to carveol and carvone.

US2015/0374018 discloses a shelf stable delivery system comprising a natural extract containing saponins as emulsifier, a carbohydrate having a number average molecular weight of from 445 to about 687 g·mol$^{-1}$ and an oxidizable flavor or fragrance. However, carbodyrates disclosed in this document comprise maltodextrins which are less desirable in many food applications, compared to flavor delivery systems containing natural ingredients.

Accordingly, there is a need for shelf-stable delivery systems containing natural ingredients.

SUMMARY OF THE INVENTION

The present invention solves the above-mentioned problems by providing a powdered composition with good performance. In particular the association of a natural emulsifier with a carrier comprising inulin with a DP≤15 is unexpectedly tremendously improving the oxidation stability of such delivery systems compared to conventional delivery systems using starch derivatives as carrier.

Thus, a first object of the invention is a powdered composition comprising:
  from 40 to 95% of a carrier comprising inulin having a degree of polymerization (DP) equal or less than 15,
  from 0.01 to 30% of a natural emulsifier; and
  from 5 to 40% of a hydrophobic active ingredient comprising a flavor or a perfume, the percentages being defined by weight, relative to the total weight of the composition.

A second object of the invention is a process for preparing the powdered composition as defined above, said process comprising the steps of:
  (i) preparing an emulsion comprising:
  from 20 to 80% of water,
  from 14.99 to 70%, preferably from 30 to 70% of a carrier comprising inulin having a DP equal or less than 15,
  from 0.01 to 20% of a natural emulsifier; and
  from 5 to 30% of a hydrophobic active ingredient comprising a flavor or a perfume,
  (ii) drying the emulsion obtained in step i) so as to obtain a powdered composition.

A third object of the invention is a process for preparing extruded particles, wherein the process comprises the steps of:
a) preparing a mixture comprising
  from 40 to 95% of a carrier comprising inulin having a degree of polymerization (DP) equal or less than 15,
  from 0.01 to 30% of a natural emulsifier; and
  from 5 to 40% of a hydrophobic active ingredient comprising a flavor or a perfume;
b) heating said mixture within a screw extruder to a temperature preferably comprised between 90 and 130° C. to form a molten mass;
c) extruding the molten mass through a die;
d) chopping the molten mass as it exits the die to provide extruded particles.

A fourth object of the invention is a consumer product selected from the group consisting of a powdered beverage, a sweet good, and a savory good, comprising the composition as defined above.

A fifth object of the invention is the use of a carrier comprising, preferably consisting of inulin having a DE≤15 and a natural emulsifier, for increasing the oxidation stability of a powdered composition comprising a flavor or a perfume dispersed in said carrier.

DETAILED DESCRIPTION OF THE INVENTION

Figure 1:
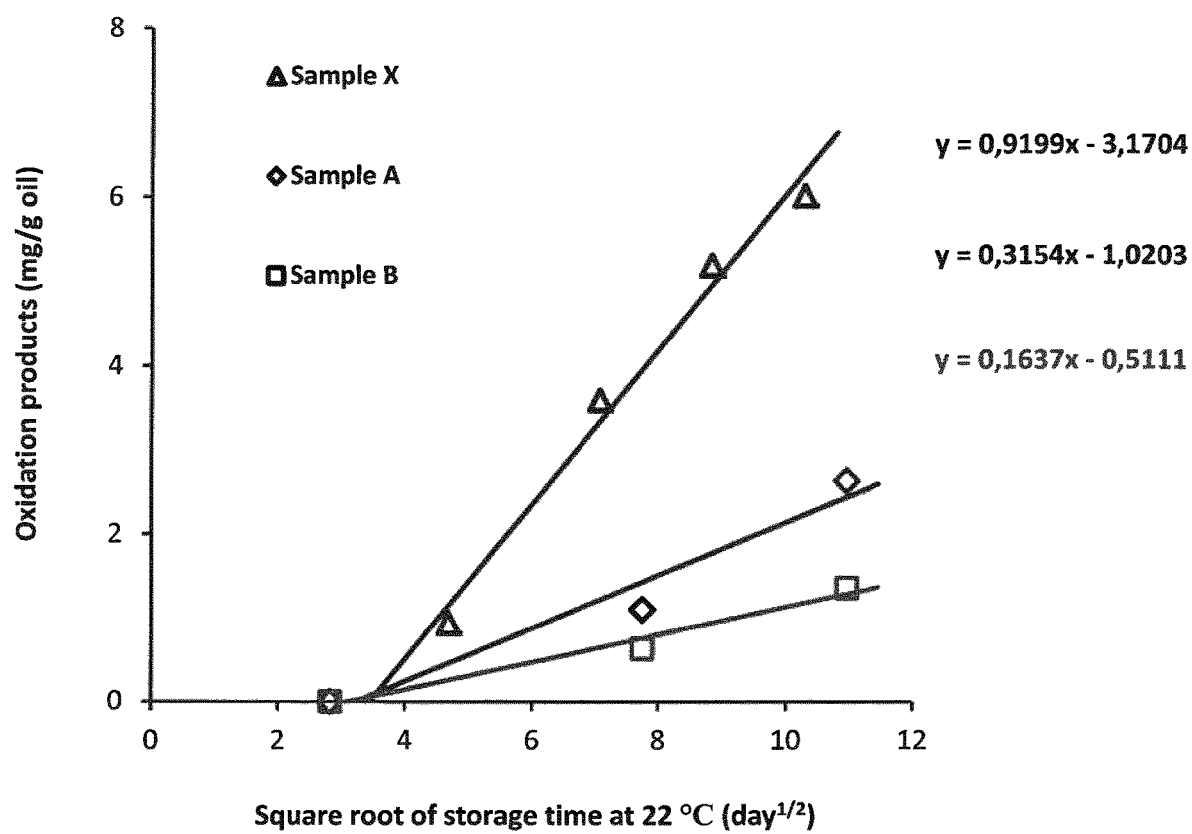
FIG. 1: Concentration of Oxidation Products (Ops) including limonene oxide and carvone during storage (22° C.) for compositions according to the invention (samples A and B) and for comparative composition (sample X).

Unless stated otherwise, percentages (%) are meant to designate a percentage by weight of a composition.

It should be understood that the total amount of ingredients in the composition or emulsion is 100%. The person skilled in the art will select the amounts of the different components so as to have a total amount which does not exceed 100%.

"Powdered composition", "dried particles", "particles", "granules" are used indifferently according to the present invention. It should be understood that powdered composition encompasses particles (terminology used when the powdered composition is obtained by spray-drying) and granules (terminology used when the powdered composition is obtained by extrusion).

Powdered Composition

A first object of the invention is a powdered composition comprising:
from 40 to 95% of a carrier comprising inulin having a degree of polymerization (DP) equal or less than 15,
from 0.01 to 30% of a natural emulsifier; and
from 5 to 40% a hydrophobic active ingredient comprising a flavor or a perfume, the percentages being defined by weight, relative to the total weight of the composition.

According to an embodiment, the powdered composition comprises from 40 to 94.99% of a carrier comprising inulin having a degree of polymerization (DP) equal or less than 15.

Carrier Comprising Inulin

Inulin is a polymer of β(2→1) linked D-fructose units with a terminal glucose unit and is defined according different degrees of polymerization (DP). DP refers to the number of units in a polysaccharide chain.

The present invention is notably characterized by the fact that the carrier comprises inulin having a DP (degree of polymerization) equal or less than 15.

According to a particular embodiment, inulin has a DP value between 3 and 15.

According to a particular embodiment, the carrier consists of inulin having a DP (degree of polymerization) equal or less than 15.

According to an embodiment, the carrier comprises inulin having a DP (degree of polymerization) less than 10. According to a particular embodiment, the carrier consists of inulin having a DP (degree of polymerization) less than 10.

According to a particular embodiment, inulin has a DP value between 3 and 9, preferably between 4.5 and 9.

According to another embodiment, inulin has a DP value between 4.5 and 15, preferably between 4.5 and 10.

The degree of polymerization, or DP, is well known by the person skilled in the art and can be defined as the number of monomeric units in a macromolecule or polymer or oligomer molecule.

The number-average degree of polymerization of inulin is given by the following formula:

$$DP=(M_n-18)/162$$

where $M_n$ is the number-average molecular weight.

Thus, DP can be easily determined by different methods such as for example size exclusion chromatography (SEC).

The DP defined in the present invention has been determined by using SEC instrument (Viscotek TDA305 max system (Malvern Instruments, Ltd, UK) with Viscotek Triple Detector Array (TDA) incorporating Refractive Index (RI), Light Scattering (LS), and Viscosity (VS) detectors).

According to an embodiment, inulin has a number average molecular weight greater than 300 g·mol$^{-1}$, preferably greater than 500 g·mol$^{-1}$, preferably between 500 and 2000 g·mol$^{-1}$. According to a particular embodiment, inulin has a number average molecular weight comprised between 400 and 1500 g·mol$^{-1}$.

Inulin of the present invention is preferably a natural or a plant-based inulin. The wording "plant-based inulin" comprises not only whole plants which contain inulin, but also inulin-containing parts of plants such as, e.g. roots, tubers, stems, blossoms, leaves.

Inulin used in the present invention can be extracted from many plants. Globe and Jerusalem artichokes, chicory, and agave are plants that can be used for the extraction of inulin, but other foods, such as wheat, bananas, onions, and garlic that contain inulin can also be used.

According to an embodiment, the plant material consists of plant roots, preferably roots of artichokes (*Cynara cardunculus* or *Cynara scolymus*) or chicory (*Cichorium intybus*).

According to an embodiment, the inulin is a chicory inulin, preferably obtained by water extraction of chicory root.

Inulin originated from chicory root extracts are commercially available from a number of suppliers including Raftilose® and Raftiline® by Orafti, Fibrulose® and Fibruline® by Cosucra, Frutafit® by Imperial Sensus, Oliggo-Fiber® by Cargill.

The inulin is used in an amount between 40 and 95%, preferably between 40 and 94.99%, more preferably between 60 and 90% by weight based on the total weight of the composition.

Natural Emulsifier

By "natural emulsifier", it should be understood that the emulsifier is obtained from natural raw materials, such as plant-based phospholipids, proteins, polysaccharides and bio surfactants.

According to an embodiment, the natural emulsifier is derived from a botanical source.

It has been shown that the combination between at least one natural emulsifier and inulin having a DP≤15 as a carrier provides particles with good performance notably in terms of oxidation stability compared to conventional delivery systems comprising maltodextrin as carrier.

The natural emulsifier used in the present invention is preferably selected from the group consisting of a natural extract containing saponins; a lecithin, gum Arabic, citrus fiber, pea protein, non-starch polysaccharide and mixtures thereof.

According to an embodiment, the natural emulsifier used in the present invention comprises, preferably consists of a natural extract containing saponins.

Saponins are amphiphilic glycosides composed of one or more hydrophilic glucoside moiety combined with a lipophilic triterpene derivative. Saponins are present in diverse plant extracts. The term "natural extract comprising saponins" refers to any saponin or mixture of substances comprising saponins obtained by applying a physical separation process to a raw material that is available in nature. Particular natural extracts are those comprising at least 10% by weight, more particularly at least 20% by weight, even more particularly at least 50% by weight, most particularly at least 80% by weight, relative to the total weight of the extract, of saponins on dry weight basis.

Particular natural extracts that can be used herein may comprise plant extracts, such as *Quillaja* extract, camellia seeds extract, achyranthe extract, glycyrrhizine and stevia. *Quillaja* extract, which is obtained from the bark of *Quillaja saponaria* is particular embodiment provided herein. Such plant extracts are commercially available from a number of suppliers. For example, *Quillaja* extract can be purchased in a dilute form from Ingredion under the tradename Q-NATURALE™ (*Quillaja* extract in water).

According to an embodiment, the saponin content is used in an amount, by weight, of from 0.01% up to about 1%, preferably from 0.06 up to 1%, relative to the total weight composition.

According to another embodiment, the natural extract containing saponins is used in combination with at least one component chosen in the group consisting of lecithin, gum Arabic, citrus fiber, pea protein and non-starch polysaccharide.

According to another embodiment, the natural emulsifier is gum Arabic, wherein the weight ratio between inulin and gum Arabic is preferably comprised between 50:50 and 95:5.

Gum Arabic is preferably used in an amount comprised between 5 and 30% by weight based on the total weight of the composition.

According to another embodiment, the natural emulsifier is a lecithin, preferably in an amount comprised between 0.5 and 5% by weight based on the total weight of the composition.

Hydrophobic Active Ingredient

Hydrophobic active ingredients comprise flavouring and/or perfuming ingredients that are preferably subject to oxidation ("oxidizable') and encompass both flavour and fragrance ingredients or compositions of current use in the flavor and/or fragrance industry, including those of natural or synthetic origin and in the form of single compounds or mixtures thereof. Specific examples of such flavour and/or fragrance ingredients may be found in the current literature, e.g. in Fenaroli's Handbook of flavour ingredients, 1975, CRC Press; Synthetic Food adjuncts, 1947 by M. B. Jacobs, edited by Van Nostrand; or Perfume and Flavor Chemicals by S. Arctander, 1969, Montclair, New Jersey (USA). Many other examples of current flavouring and/or perfuming ingredients may be found in the patent and general literature available. The flavouring and/or perfuming ingredients may be present in the form of a mixture with solvents, adjuvants, additives and/or other components, generally those of current use in the flavour and fragrance industry.

"Flavouring ingredients" as used herein are compounds that are well known to a person skilled in the art of aromatising as those that are capable of imparting a flavour or taste to a consumer product, or of modifying the taste and/or flavour of the consumer product, or yet its texture or mouthfeel.

The term "perfuming ingredients" is understood to mean compounds which are used as active ingredients in perfuming preparations or compositions in order to impart a hedonic effect when applied on a surface. In other words, such compounds, to be considered as being perfuming ones, must be recognized by a person skilled in the art of perfumery as being able to impart or modify in a positive or pleasant way the odor of a composition or of an article or surface, and not just as having an odor. Moreover, this definition is also meant to include compounds that do not necessarily have an odor but are capable of modulating the odor of a perfuming composition, perfumed article or surface and, as a result, of modifying the perception by a user of the odor of such a composition, article or surface. It also contains malodor counteracting ingredients and compositions. By the term "malodor counteracting ingredient" we mean here compounds which are capable of reducing the perception of malodor, i.e., of an odor that is unpleasant or offensive to the human nose by counteracting and/or masking malodors. In a particular embodiment, these compounds have the ability to react with key compounds causing known malodors. The reactions result in reduction of the malodor materials' airborne levels and consequent reduction in the perception of the malodor.

In particular, the flavor and/or fragrance provided herein are a flavor or fragrance that is subject to oxidation ("oxidizable). Flavours and/or fragrance characterized by a log P value of 2 or more are particularly embodiments provided herein.

Flavours that are derived from or based fruits where citric acid is the predominant, naturally-occurring acid include but are not limited to, for example, citrus fruits (e.g., lemon, lime), limonene, strawberry, orange, and pineapple. In one embodiment, the flavours food is lemon, lime or orange juice extracted directly from the fruit. Further embodiments of the flavour comprise the juice or liquid extracted from oranges, lemons, grapefruits, key limes, citrons, clementines, mandarins, tangerines, and any other citrus fruit, or variation or hybrid thereof. In a particular embodiment, the flavour comprises a liquid extracted or distilled from oranges, lemons, grapefruits, key limes, citrons, clementines, mandarins, tangerines, any other citrus fruit or variation or hybrid thereof, pomegranates, kiwifruits, watermelons, apples, bananas, blueberries, melons, ginger, bell peppers, cucumbers, passion fruits, mangos, pears, tomatoes, and strawberries.

According to an embodiment, the flavor is a citrus flavor.

In a particular embodiment, the flavour comprises a composition that comprises limonene, in a particular embodiment, the composition is a citrus that further comprises limonene.

In further embodiments, the flavour and/or fragrance is provided in an amount, by weight, is used in an amount of from about 5 to about 40% by weight, more particularly from 10 to 30% by weight, relative to the total weight of the composition.

In a particular embodiment, the average size of the particles is typically between 20 and 5000 microns. When the composition is obtained by spray drying the powder composition is made of particles having an average size preferably between 50 and 500 microns, and even more preferably from 50 to 250 microns.

When the composition is obtained by extrusion, the powder composition is made of particles having an average size preferably between 0.5 and 5000 microns.

According to an embodiment, the powdered composition is free from starch derivatives.

According to an embodiment, the powdered composition is free from maltodextrins.

According to an embodiment, the powdered composition is free from modified starch.

According to a particular embodiment, the powdered composition comprises:
from 40 to 95%, preferably from 40 to 94.99% of inulin having a DP less than 15, preferably less than 10
from 0.01 to 30% of a natural extract containing saponins, and
from 5 to 40% of a flavor, preferably a citrus flavor, the percentages being defined by weight, relative to the total weight of the composition.

The shelf-life of the powdered composition is preferably greater than about 12 months.

According to an embodiment, the shelf life of the powder is from about 12 months to about 24 months, preferably from about 12 months to about 18 months.

Process for Preparing the Powdered Composition

The composition may be prepared by any suitable method readily selected by one of ordinary skill in the art. Non-limiting examples of methods include extrusion, spray drying, and the like.

Spray-Drying Process

According to an embodiment, the composition is prepared by spray drying according to the methods disclosed in U.S. Patent Application Publication No. 2015/0374018 A1.

Thus, another object of the invention is a process for preparing the powdered composition as defined above, said process comprising the steps of:
 (i) preparing an emulsion comprising:
  from 20 to 80% of water,
  from 14.99 to 70%, preferably, preferably from 30 to 70% of a carrier comprising inulin having a DP equal or less than 15,
  from 0.01 to 20% of a natural emulsifier; and
  from 5 to 30% of a hydrophobic active ingredient comprising a flavor or a perfume,
 (ii) drying the emulsion obtained in step i) so as to obtain a powdered composition.

The emulsion can be formed using any known emulsifying method, such as high shear mixing, sonication or homogenization. Such emulsifying methods are well known to the person skilled in the art.

According to an embodiment, the emulsion has a viscosity comprised between 50 mPa·s and 500 mPa·s at 65° C. with shear rate of 100 s$^{-1}$ The flow viscosity was measured using a TA Instruments AR2000 rheometer (New Castle, DE, USA) with concentric cylinder geometry.

In a preferred aspect of the invention, the amount of water in the emulsion is comprised between 40 and 60% by weight, relative to the total weight of the emulsion.

According to an embodiment, the amount of inulin in the emulsion is comprised between 40 and 60% by weight, relative to the total weight of the emulsion.

According to an embodiment, the amount of natural emulsifier in the emulsion is comprised between 0.01 and 20% by weight, relative to the total weight of the emulsion.

According to an embodiment, the amount of active ingredient in the emulsion is comprised between 10 and 30% by weight, relative to the total weight of the emulsion.

The other embodiments previously described for the natural emulsifier, for the carrier comprising inulin and for the hydrophobic active ingredient also apply for the process.

The emulsion may also contain optional ingredients. It may in particular further contain an effective amount of a fireproofing or explosion suppression agent. The type and concentration of such agents in spray-drying emulsions is known to the person skilled in the art. One can cite as non-limiting examples of such fireproofing or explosion suppression agents inorganic salts, $C_1$-$C_{12}$ carboxylic acids, salts of $C_1$-$C_{12}$ carboxylic acids and mixtures thereof. Preferred explosion suppression agents are, salicylic acid, acetic acid, propionic acid, butyric acid, isobutyric acid, valeric acid, caproic acid, citric acid, succinic acid, hydroxysuccinic acid, maleic acid, fumaric acid, oxylic acid, glyoxylic acid, adipic acid, lactic acid, tartaric acid, ascorbic acid, the potassium, calcium and/or sodium salts of any of the aforementioned acids, and mixtures of any of these.

Other optional ingredients include antioxidants, preservatives, colorants and dyes.

The droplet size d(v,0.9) of the emulsion is preferably comprised between 0.5 and 15 µm, more preferably between 0.5 and 10 µm.

According to an embodiment, in step ii), the emulsion is spray-dried so as to obtain a powdered composition.

When spray-drying is used, the emulsion is first subjected to a spraying step during which the emulsion is dispersed in the form of drops into a spraying tower. Any device capable of dispersing the emulsion in the form of drops can be used to carry out such dispersion. For instance, the emulsion can be guided through a spraying nozzle or through a centrifugal wheel disk. Vibrated orifices may also be used.

In one aspect of the invention the emulsion is dispersed in the form of drops into a cloud of powdering agent present in the dry tower. Such type of process is for example described in details in WO2007/054853 or in WO2007/135583.

For a specific formulation, the size of the particles is influenced by the size of the drops that are dispersed into the tower. When a spraying nozzle is used for dispersing the drops, the size of such drops can be controlled by the flow rate of an atomising gas through the nozzle, for example. In the case where a centrifugal wheel disk is used for dispersal, the main factor for adjusting droplet size is the centrifugal force with which the drops are dispersed from the disk into the tower. The centrifugal force, in turn, depends on the speed of rotation and the diameter of the disk. The feed flow rate of the emulsion, its surface tension and its viscosity are also parameters controlling the final drop size and size distribution. By adjusting these parameters, the skilled person can control the size of the drops of the emulsion to be dispersed in the tower.

Once sprayed in the chamber, the droplets are dried using any technique known in the art. These methods are perfectly documented in the patent and non-patent literature in the art of spray-drying. For example, Spray-Drying Handbook, 3$^{rd}$ ed., K. Masters; John Wiley (1979), describes a wide variety of spray-drying methods.

The process of the present invention may be performed in any conventional spraying tower. A conventional multi-stage drying apparatus is for example appropriate for conducting the steps of this process. It may comprise a spraying tower, and, at the bottom of the tower, a fluidised bed intercepting partially dried particles after falling through the tower.

The amount of flavour or fragrance lost during the spray drying step is preferably below 15%, more preferably below 10%, most preferably below 5%, these percentages being defined by weight, relative to the theoretical amount that would be present in the particles if there was absolutely no flavour or fragrance lost during the spray-drying step.

Extrusion Process

According to another embodiment, the composition is prepared by twin-screw extrusion according to the methods disclosed in International Patent Application Publication No. WO2016/102426 A1.

Thus, another object of the invention is a process for preparing extruded particles, wherein the process comprises the steps of:
a) preparing a mixture comprising
 from 40 to 95% of a carrier comprising inulin having a degree of polymerization (DP) equal or less than 15,
 from 0.01 to 30% of a natural emulsifier; and
 from 5 to 40% of a hydrophobic active ingredient comprising a flavor or a perfume;

b) heating said mixture within a screw extruder to a temperature preferably comprised between 90 and 130° C. to form a molten mass;
c) extruding the molten mass through a die;
d) chopping the molten mass as it exits the die to provide extruded particles.

The definition of the carrier, natural emulsifier and hydrophobic active ingredient are the same as described hereinabove.

The extruded particles may be formed at the die face of the extruder while still hot using for example cutting process.

In one embodiment the extruded particles have a size of about 0.5 to 5 mm

In one embodiment the glass transition temperature of the particle is substantially the same as the glass transition temperature of the mixture. This is attained by ensuring low—or no—loss of water.

According to this particular embodiment, a small amount of water is added to the mixture to guarantee that the glass transition temperature ($T_g$) of the resulting melt corresponds to and is substantially the same as that of the desired $T_g$ value of the final product. In other words, contrary to other methods such as wet-granulation, the glass transition temperature of the mixture before extrusion has already the value required for the final product, which temperature is above room temperature and preferably above 40° C. so that the product can be stored at ambient temperature in the form of free-flowing granules. As a consequence, this embodiment of the invention can dispense with the additional drying step following the extrusion, intended to remove water in order to increase $T_g$ to an acceptable value.

The mixture is thus extruded in an extruder assembly which maintains the temperature of the mixture at a predetermined temperature which is comprised between 90 and 130° C. This temperature is adapted to the system of the invention: first of all, it has to be above the glass transition temperature of the carbohydrate matrix in order to keep the mixture in the form of a molten mass. Pressure is also applied and adjusted to a value appropriate to maintain homogeneity of the melt. Typically, pressure values of up to 100 bar ($10^7$ Pa) can be used depending on the size of the equipments (for example one may need to increase the pressure to 200 bar for larger scale extruders).

In this particular embodiment, as the mixture comes to the die part of the extruder, the temperature is still above the glass transition temperature of the carrier. The extruder is equipped with a cutter-knife and the mixture is thus cut at the temperature of the melt. Once cooled to ambient temperature by the surrounding air, the already cut glassy material does not need to be shaped or dried in a spheroniser, fluid-bed dryer or other device, unlike what is the case with other processes where the molten matrix is cooled prior to the cutting. In a particular embodiment the surrounding air comprises chilled air.

The glass transition temperature of the volatile compound/carbohydrate mixture depends on the amount of water added to the initial mixture. In fact, it is well known in the art that the $T_g$ decreases when the proportion of water increases. In the latter embodiment of the invention, the proportion of water added to the mixture will be low, i.e. such that the glass transition temperature of the resulting mixture is substantially equal to the glass transition temperature desired for the final flavour or fragrance delivery system, i.e. the extruded product.

Now, as mentioned above, a requirement for the resulting encapsulated compound or composition is to present a glass transition temperature $T_g$ significantly above the temperature at which it will be stored and subsequently used. The critical temperature ($T_g$) must thus be at least above room temperature and preferably above 40° C. The proportions in which water is employed in the present invention therefore vary in a wide range of values which the skilled person is capable of adapting and choosing as a function of the carbohydrate glass used in the matrix and the required $T_g$ of the final product.

As cited before the extruding step of this process requires an extruding apparatus. A commercially acceptable extruding apparatus is that under the trade name designation Clextral BC 21 twin-screw extruder equipped with a cutter-knife allowing to chop the melt at the die exit, when it is still plastic. The product which is cut is thus still at a temperature which is above the glass transition temperature of the matrix.

Extruding apparatuses are not limited to the twin screw variety and may also include, for example, single screw, ram, or other similar extrusion methods.

During the extrusion process, the mixture is forced through a die having an orifice with a predetermined diameter which ranges from about 0.250 to 10 mm, more particularly from about 0.5 up to about 2.0 mm and more particularly from 0.7 to 2.0 mm. However, much larger diameters for the die are also possible.

The length of the pieces is regulated by controlling the stroke rate of the specific cutting apparatus.

The severed pieces are subsequently cooled to ambient temperature by the surrounding air. No drying or further treatment is needed. The resulting granules present a size uniformity and this size uniformity of the resulting capsules allows an improved control of flavour release.

According to this particular embodiment of the invention, where the granulation is carried out as the melt exits the die, there are thus obtained solid flavor delivery systems of substantially uniform granulometry.

In another embodiment, a lubricant is provided herein. While not wishing to be bound to any theory it is believed that the lubricant reduces shear and expansion of the molten mass at the exit die. In some embodiments, the lubricant may comprise a medium chain triglyceride (MCT). In another embodiment, the lubricant comprises a micellar surfactant like lecithin or a fatty acid ester (e.g., citric, tartaric, acetic), DATEM, CITREM or mixtures of the above. In a particular embodiment, the lubricant may be provided in an amount, by weight, up to about 5%, particularly about 0.2 up to about 5%, more particularly from about 0.8% up to about 2% and even more particularly from about 1 to 2% of the total weight of the particle. In the embodiment the lubricant is provided in an amount of 2% of the total weight of the particle. In another embodiment the lubricant is provided in an amount of 1% of the total weight of the particle.

Consumer Product

Another object of the invention is a consumer product comprising the composition of the invention. Preferably such product is a flavoured or fragranced product.

Preferably, the flavoured product is a food product.

When the food product is a particulate or powdery food, the dry particles may easily be added thereto by dry-mixing. Typical food products are selected from the group consisting of an instant soup or sauce, a breakfast cereal, a powdered milk, a baby food, a powdered drink, a powdered chocolate drink, a spread, a powdered cereal drink, a chewing gum, an effervescent tablet, a cereal bar, and a chocolate bar. The powdered foods or drinks may be intended to be consumed after reconstitution of the product with water, milk and/or a juice, or another aqueous liquid.

The dry particles provided herein may be suitable for conveying flavors to beverages, fluid dairy products, condiments, baked goods, frostings, bakery fillings, candy, chewing gum and other food products.

Beverages include, without limitation, carbonated soft drinks, including cola, lemon-lime, root beer, heavy citrus ("dew type"), fruit flavored and cream sodas; powdered soft drinks, as well as liquid concentrates such as fountain syrups and cordials; coffee and coffee-based drinks, coffee substitutes and cereal-based beverages; teas, including dry mix products as well as ready-to-drink teas (herbal and tealeaf based); fruit and vegetable juices and juice flavored beverages as well as juice drinks, nectars, concentrates, punches and "ades"; sweetened and flavored waters, both carbonated and still; sport/energy/health drinks; alcoholic beverages plus alcohol-free and other low-alcohol products including beer and malt beverages, cider, and wines (still, sparkling, fortified wines and wine coolers); other beverages processed with heating (infusions, pasteurization, ultra-high temperature, ohmic heating or commercial aseptic sterilization) and hot-filled packaging; and cold-filled products made through filtration or other preservation techniques.

Fluid dairy products include, without limitation, non-frozen, partially frozen and frozen fluid dairy products such as, for example, milks, ice creams, sorbets and yogurts.

Condiments include, without limitation, ketchup, mayonnaise, salad dressing, Worcestershire sauce, fruit-flavored sauce, chocolate sauce, tomato sauce, chili sauce, and mustard.

Baked goods include, without limitation, cakes, cookies, pastries, breads, donuts and the like.

Bakery fillings include, without limitation, low or neutral pH fillings, high, medium or low solids fillings, fruit or milk based (pudding type or mousse type) fillings, hot or cold make-up fillings and nonfat to full-fat fillings.

The composition of the present invention has the advantage of having improved oxidation stability.

EXAMPLES

The invention will now be described in further detail by way of the following examples.

Size Exclusion Chromatography (SEC)

The SEC instrument is the Viscotek TDA305 max system (Malvern Instruments, Ltd, UK) with Viscotek Triple Detector Array (TDA) incorporating Refractive Index (RI), Light Scattering (LS), and Viscosity (VS) detectors. The chromatographic system consists of A2000 (CLM3015) and A6000 (CLM3020) (300 mm L×8.0 mm ID, Malvern Instruments Ltd.) put in series after a A7 guard column, with claimed exclusion limits for pullulan of 4 KDa and 2000 KDa respectively. The eluent is 0.1 M sodium nitrate with a flow rate of 0.4 mL/min. The injected volume is 100 µL with sample concentration of around 2 mg/mL. All measurements were conducted at 35° C. Reproducibility of the method is acceptable with standard deviation of 0.06% on retention volume at peak maximum for three consecutive injections. Glucose (>99.5%, Sigma-Aldrich), maltose (Mn: 360.31, >99%, Sigma-Aldrich), maltotriose (>98%, Mn 504, TCI), maltotetraose (MW: 666.58, TRC-Canada), maltopentaose (MW:828.72, >95.0%,TCI), maltohexaose (MW: 990.86, TRC-Canada) and P-82 shodex pullulan standards (Showa Denko K.K., Japan) of 6100, 9600, 21100, 47100, 107000, 194000, 337000 and 642000 g/mol were used as received for calibration standards. Here conventional calibration line based on the standards is used to calculate the molecular weight of the polymers.

Sample Preparation for Storage Study in Parr Reactor

The spray dry powder samples were placed into 4 dram glass vials and the vials were filled to within about a quarter-inch of the top of the vial. The Parr reactor was placed into a 35° C. oven which was held constant at this temperature for the duration of the study. Subsamples of approximately 500 mg were removed from the sample vial in the Parr reactor at weeks 1, 2, 4, 6 and 8. After removal of the subsamples from the Parr reactor, the reactor was sealed again, flushed with oxygen three times, and then filled with oxygen to capacity, and placed back in the 35° C. oven until it was time to sample again.

Solvent Extraction-GC Analysis (Room Temperature Storage Study)

Limonene, limonene oxide, and carvone content of the samples were determined simultaneously by GC Analysis using acetone with 2-nonanone as an internal standard to extract the oil from reconstituted powder. All samples were prepared in triplicate. In a 4 dram sample vial, 0.50 g of powder and approximately 0.35 g of sodium chloride was dissolved with 2.0 g of deionized water. A 3 mL portion of acetone with internal standard was added to the vial, mixed gently but thoroughly, and allowed to separate. The solvent portion was removed and reserved, and a second 3 mL portion of acetone with internal standard was added to the dissolved sample, mixed gently but thoroughly, and allowed to separate. The solvent portion was removed and combined with the previously reserved solvent and analyzed by GC to quantify the oxidation products. An Agilent 6890N gas chromatograph (Santa Clara, CA) with auto sampler and FID was for detection: 30 M Fused Silica Capillary Column (0.25 mm id) and 5% Phenyl Methyl Siloxane Stationary Phase; helium (2 mL/min column flow); split ration 50:1; injection port and detector temp 250° C.; oven 140° C. with run time of 4 minutes.

GC-MS Analysis (Accelerated Oxidation Study Using Parr Reactor)

The oxidation study was terminated after 8 weeks. Samples were prepared by weighing approximately 100 mg of each sample (exact weight was noted in notebook for later calculations) into 20 mL glass headspace vials. Two samples were weighed and analyzed for each data point. The two samples were averaged together and the average was used for the calculations. Deionized water (1.5 mL) was added to each vial, along with 10 microliters of a 500 ppm chlorocyclohexane internal standard solution. The internal standard solution was comprised of chlorocyclohexane dissolved in isopropanol.

After preparing the samples for analysis, they were transferred to a SPME headspace autosampler tray, and the sequence on the GCMS was started. All samples were analyzed on an Agilent 7890A gas chromatograph (GC) equipped with an Agilent 5975C mass spectrometer (MSD).

Example 1

Preparation of the Powdered Composition

Single fold orange oil was spray dried with different carriers as shown in Table 1. A reference was also produced using 18 DE maltodextrin as a carrier. Q-Naturale® (QS) served as the emulsifier at a concentration of 0.08% (dry matter basis).

TABLE 1

Spray dry formulation and process conditions.

| Ingredients | Comparative sample X | Sample A | Sample B | Sample C |
|---|---|---|---|---|
| Emulsion (grams) | | | | |
| Orange Oil [1] | 1,400 | 1,400 | 1,400 | 1,400 |
| Maltodextrin [2] | 5,866 | — | — | — |
| Inulin [3] | — | 5,866 | — | — |
| Inulin [4] | — | — | 5,866 | — |
| Inulin [5] | — | — | — | 5,866 |
| Saponins [6] | 6 | 6 | 6 | 6 |
| Water | 7,022 | 7,022 | 7,022 | 7,022 |
| Spray-dried particles | | | | |
| Orange Oil [1] | 20% | 20% | 20% | 20% |
| Maltodextrin [2] | 79.92% | — | — | — |
| Inulin [3] | — | 79.92% | — | — |
| Inulin [4] | — | — | 79.92% | — |
| Inulin [5] | — | — | — | 79.92% |
| Saponins [6] | 0.08% | 0.08% | 0.08% | 0.08% |
| Spray drying conditions | | | | |
| Two stage homogenization (psi) | 2500 + 500 | 2500 + 500 | 2500 + 500 | 2500 + 500 |
| Spray pressure (psi) | 2000 | 2000 | 2000 | 2000 |
| Outlet air temperature | 78° C. | 77° C. | 81° C. | 80° C. |

[1] Origin, Firmenich
[2] Maltodextrin 18 DE, Origin: Roquettes Frères
[3] Oliggo-Fiber ® DS2, Origin: Cargill
[4] Oliggo-Fiber ® F97, Origin: Cargill
[5] Oliggo-Fiber ® F97 + Oliggo-Fiber ® L90 (50:50), Origin: Cargill
[6] Q-Naturale ® 200 (expressed on dry basis), Origin: Ingredion Different physical parameters were determined/calculated as shown in table 2.

TABLE 2

Physical parameters determined by SEC

| Carrier composition | SEC | | |
|---|---|---|---|
| | DP | $M_n$ | $M_w$ |
| Sample X | 6.9 | 1130 | 8440 |
| Sample C | 3.3 | 558 | N/A |
| Sample B | 4.8 | 788 | 1660 |
| Sample A | 7.7 | 1260 | 3100 |

Example 2

Oxidation Stability

Figure 2:
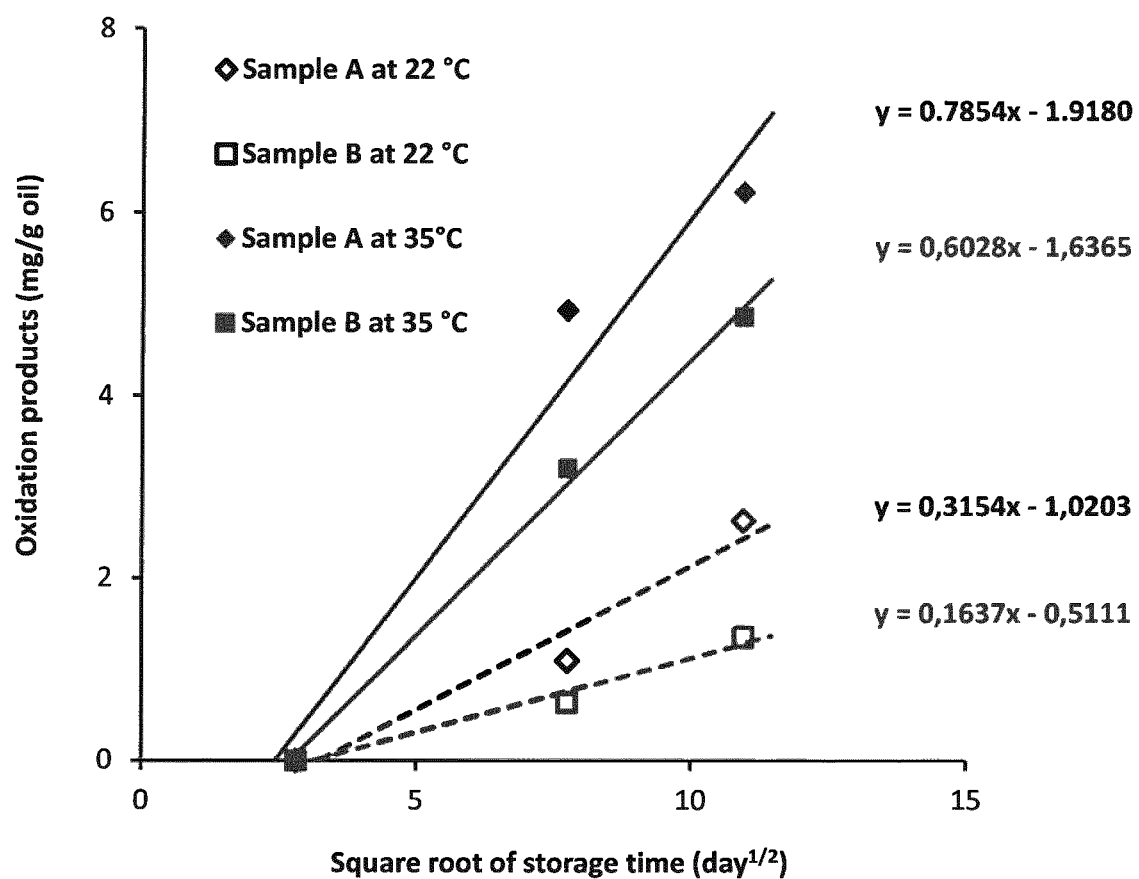
FIG. 2: Concentration of Oxidation Products (Ops) including limonene oxide and carvone during storage (22° C. and 35° C.) for compositions according to the invention (samples A and B).

Samples prepared according to example 1 were stored in sterile sample bags (made of virgin polyethylene) at 22° C. and 35° C., respectively. The formation of limonene oxide and carvone (oxidation products of limonene) was monitored during storage. The data plotted in FIG. 1 clearly show that samples A and B with inulin as carrier were superior in oxidation stability compared to the reference made with 18 DE maltodextrin. The slowest oxidation rate was observed in sample B. Storage study at 35° C. (FIG. 2) confirmed that samples A and B provide good oxidation stability.

To confirm these date, a separate storage study was performed under accelerated conditions using a Parr reactor.

Samples prepared according to Example 1 were stored in a Parr reactor. The reactor was sealed, flushed with oxygen three times, filled with oxygen of 3.5 bar, and then placed into a 25° C. controlled environment room or a 35° C. oven. Sub-samples (approximately 300 mg) were removed at weeks 1, 2, 4, 6 and 8 and analyzed using solid phase micro extraction (SPME) on the gas chromatography mass spectrometry (GC-MS). All samples were compared to a time zero sample to determine concentration of oxidation products at different sampling points (i.e. no oxidation at time zero).

Figure 3:
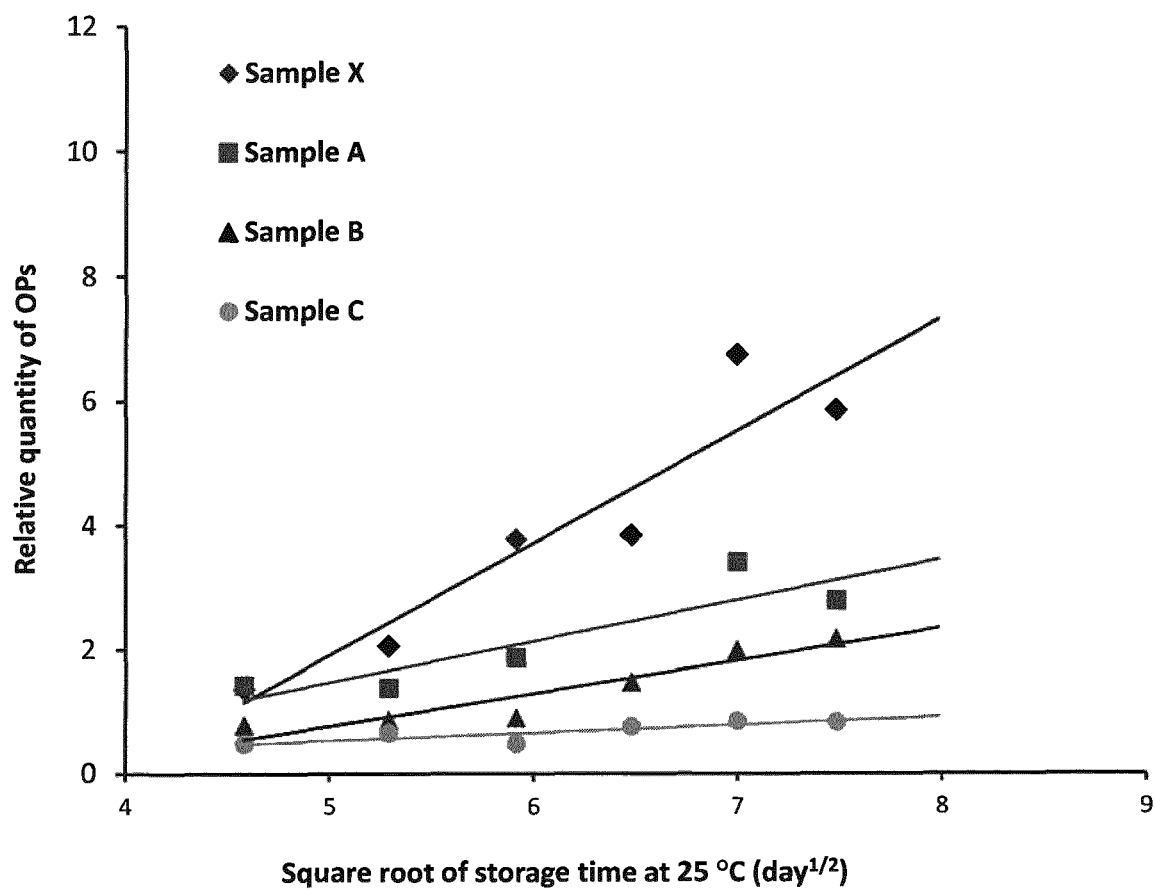
FIG. 3: Concentration of oxidation products (Ops) including limonene oxide, carvone, trans-carveol, and cis-carveol during storage (25° C.)—accelerated storage for compositions according to the invention (samples A and B and C) and for comparative composition (sample X).
Figure 4:
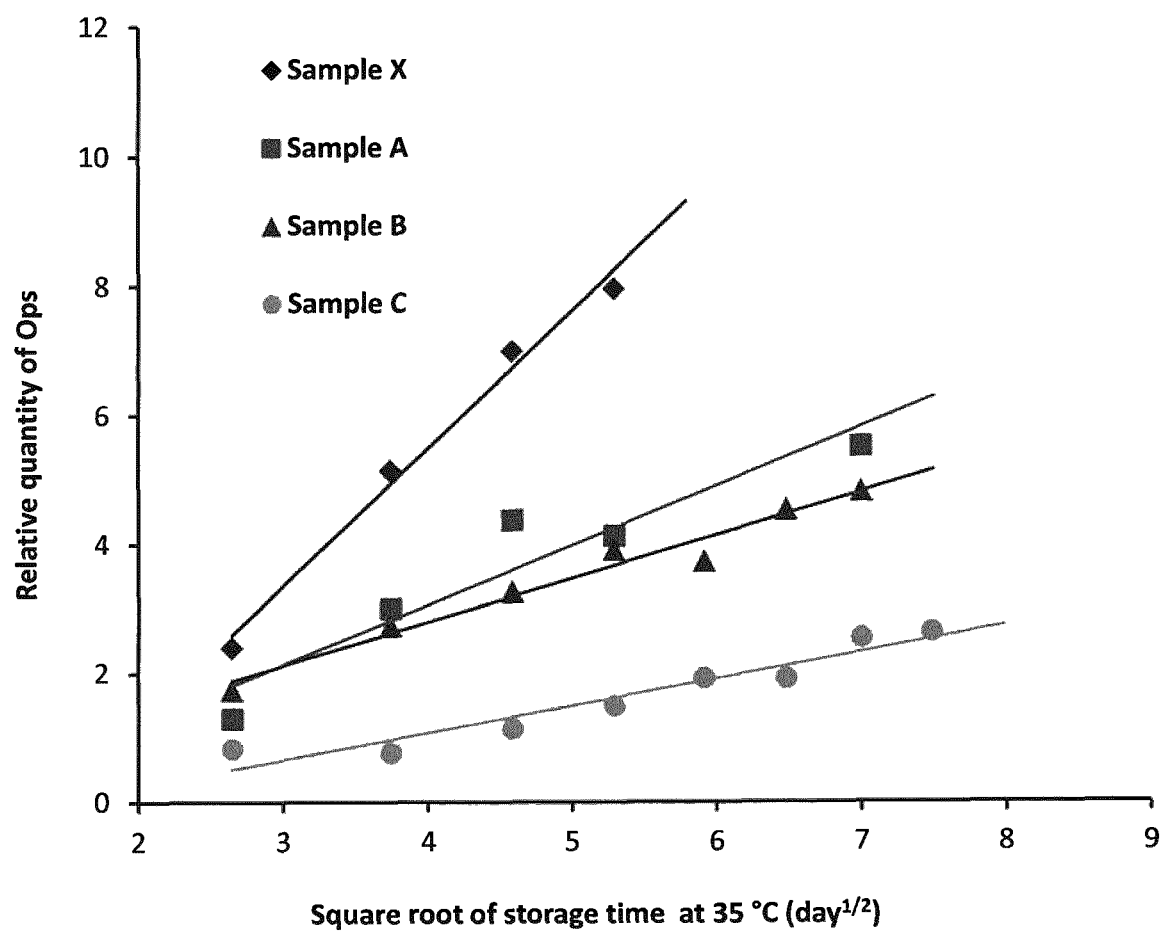
FIG. 4: Concentration of oxidation products (Ops) including limonene oxide, carvone, trans-carveol, and cis-carveol during storage (35° C.)—accelerated storage for compositions according to the invention (samples A and B and C) and for comparative composition (sample X).

The results show that samples comprising inulin as a carrier (samples A, B and C) outperform the comparative sample X (18 DE maltodextrin as carrier) regardless of the storage temperature (FIG. 3 and FIG. 4). More specifically, at 25° C., oxidation rate (slope of linear regression) of comparative sample X was substantially faster than that of Sample A with a factor of 2.7, whereas at 35° C. this factor was 2.3. The similar trend obtained from different storage studies (room temperature vs. accelerated conditions) confirms that inulin is an excellent oxygen barrier for flavor encapsulation.

Example 3

Preparation of Powdered Composition (Spray-Drying)

Caramel flavor were spray dried with Inulin and gum arabic as shown in below table. A reference was also produced using 18 DE maltodextrin and gum arabic.

TABLE 3

Spray dry formulation and process conditions.

| Ingredients | Reference | Sample D |
|---|---|---|
| Feed emulsion composition (gram) | | |
| Caramel flavor [1] | 600 | 600 |
| Gum arabic [2] | 440 | 440 |
| Maltodextrin 18 DE [3] | 3,960 | — |
| Inulin [4] | — | 3,960 |
| Water | 5,000 | 5,000 |
| Spray dried powder composition (dry basis) | | |
| Caramel flavor | 12% | 12% |
| Gum arabic | 8.8% | 8.8% |
| Maltodextrin | 79.2% | — |
| Inulin | — | 79.2% |
| Spray drying conditions | | |
| Two stage homogenization (psi) | 2500 + 500 | 2500 + 500 |
| Spray pressure (psi) | 2000 | 2000 |
| Outlet air temperature | 75° C. | 75° C. |

[1] Caramel flavor, Origin: Firmenich
[2] Gum arabic, Origin: Roquettes Frères
[3] Maltodextrin 18 DE, Origin: Roquettes Frères
[4] Oliggo-Fiber ® F97, Origin: Cargill Sensory Evaluation:

| Triangle sensory test | |
|---|---|
| Number of panelists | 42 |
| Test Design | Random, Balanced |
| Environmental Condition | Standard Booth |
| Serving Size & Temperature | ~1 oz. solution, chilled |
| Tasting solution | 5% sugar |

| Triangle sensory test | |
|---|---|
| Reference | 0.1% dosage |
| Sample D | 0.08% dosage |
| Result of statistical analysis | p-value = 0.3071 There was no significant difference between the samples at 95% confidence. |

Example 3 shows that spray dried caramel flavor using Inulin at a dosage of 0.08% achieved the same taste profile as the reference at a dosage of 0.1%. This indicates Inulin retains more volatiles during spray drying process.

Example 4

Preparation of Powdered Composition (Spray-Drying)

Cream flavor were spray dried with Inulin and gum arabic as shown in below table. A reference was also produced using 10 DE maltodextrin and gum arabic.

TABLE 4

| Spray dry formulation and process conditions. | | |
|---|---|---|
| Ingredients | Reference | Sample E |
| Feed emulsion composition (gram) | | |
| Caramel flavor [1] | 80 | 80 |
| Gum arabic [2] | 392 | 392 |
| Maltodextrin 10 DE [3] | 3,528 | |
| Inulin [4] | | 3,528 |
| Water | 6,000 | 6,000 |
| Spray dried powder composition (dry basis) | | |
| Caramel flavor | 2% | 12% |
| Gum arabic | 9.8% | 9.8% |
| Maltodextrin 10 DE | 88.2% | |
| Inulin | | 88.2% |
| Spray drying conditions | | |
| Two stage homogenization (psi) | 2500 + 500 | 2500 + 500 |
| Spray pressure (psi) | 2000 | 2000 |
| Outlet air temperature | 77° C. | 77° C. |

[1] Cream flavor, Origin: Firmenich
[2] Gum arabic, Origin: Roquettes Frères
[3] Maltodextrin 10 DE, Origin: Roquettes Frères
[4] Oliggo-Fiber ® DS2, Origin: Cargill Sensory Evaluation:

| Triangle sensory test | |
|---|---|
| Number of panelists | 41 |
| Test Design | Random, Balanced |
| Environmental Condition | Standard Booth |
| Seiwing Size & Temperature | ~1 oz. solution, chilled |
| Tasting solution | 5% sugar |
| Reference | 0.05% dosage |
| Sample D | 0.05% dosage |
| Result of statistical analysis | p-value = 0.0023 There was a significant difference between the samples at 95% confidence. |
| Comments from panelists | Sample E was sweeter, more creamy, buttery, and stronger dairy notes |

Example 4 shows that spray dried cream flavor using Inulin was significantly different from the reference. The comments provided by panelists suggested the Cream Flavor made with Oliggo-Fiber® DS2 was stronger than the reference in terms of aroma at the same dosage of 0.05%.

Example 5

Preparation of Powdered Composition (Extrusion)

A blend was prepared by mixing the following ingredients:

| Ingredients | Weight (grams) |
|---|---|
| Inulin-A[1] | 397.5 |
| Gum Arabic[2] | 41.7 |
| Lecithin | 5 |
| Limonene | 50 |
| Demineralized water | 3.75 |

[1] Inulin A, origin: Cosucra.
[2] Gum Arabic, origin: Alland & Robert.

Inulin A, origin: Cosucra. It has number average molecular weight (MO of 940 and weight average molecular weight ($M_w$) of 2300 measure by size exclusion chromatography. A lab-scale co-rotating twin screw extruder (EuraLab, ThermoScientific, L/D=32) was used to encapsulate limonene into a solid particulate form. The extruder consists of 6 barrels with independent temperature control. The blend was fed into the extruder at a flow rate of 500 grams/hr. Barrel temperatures from feeder to die end were set as 20, 20, 20, 90, 100, 110° C. Screw speed was kept as 150 rpm. The melt was extruded through a die plate with a 1.0 mm diameter hole. Die temperature was set at 100° C. After establishing steady-state extrusion conditions, the strands exiting the die were cut by means of rotating cutting blades/knives.

Uniform extruded particles showed glass transition higher than 35° C. characterized by differential scanning calorimetry (DSC, Mettler Torledo). An oil content of 9% by weight was obtained in extruded particles with oil retention of 90%. Oil retention is express as the ratio of retained oil content to theoretical oil content. Dynamic moisture sorption experiment was conducted at 25° C. and extruded particles were free of caking at relative humidity of 60%.

Example 6

Preparation of Powdered Composition (Extrusion)

A blend was prepared by mixing the following ingredients:

| Ingredients | Weight (grams) |
|---|---|
| Inulin-A[1] | 306.5 |
| Gum Arabic[2] | 131 |
| Lecithin | 5 |
| Limonene | 50 |
| Demineralized water | 7.5 |

[1] Inulin A, origin: Cosucra.
[2] Gum Arabic, origin: Alland & Robert.

A lab-scale co-rotating twin screw extruder (EuraLab, ThermoScientific, L/D=32) was used to encapsulate limonene into a solid particulate form. The extruder consists of 6 barrels with independent temperature control. The blend was fed into the extruder at a flow rate of 500 grams/hr. Barrel temperatures from feeder to die end were set as 20, 20, 20, 90, 100, 110° C. Screw speed was kept as 150 rpm. The melt was extruded through a die plate with a 1.0 mm diameter hole. Die temperature was set at 100° C. After establishing steady-state extrusion conditions, the strands exiting the die were cut by means of rotating cutting blades/knives. Uniform extruded particles showed glass transition higher than 35° C. characterized by differential scanning calorimetry (DSC, Mettler Torledo). An oil content of 8.8% by weight was obtained in extruded particles with oil retention of 88%. Dynamic moisture sorption experiment was conducted at 25° C. and extruded particles were free of caking at relative humidity of 60%. The result further confirmed that blend of inulin-A and gum arabic can be an excellent matrix for oil encapsulation via twin screw extrusion.

The invention claimed is:

1. A powdered composition comprising:
   from 40 to 95% of a carrier consisting of inulin having a degree of polymerization (DP) between 4.5 and 7.7;
   from 0.01 to 30% of a natural emulsifier; and
   from 5 to 40% of a flavor,
the percentages being defined by weight, relative to a total weight of the composition;
wherein the powdered composition is free from maltodextrins; and
wherein the carrier improves the oxidation stability of the powdered composition relative to a powdered composition including a carrier comprising maltodextrin or starch derivatives.

2. The composition according to claim 1, wherein inulin has a DP between 4.8 and 7.7.

3. The composition according to claim 1, wherein the natural emulsifier is selected from the group consisting of a natural extract containing saponins; a lecithin, gum Arabic, citrus fiber, pea protein, non-starch polysaccharide, and mixtures thereof.

4. The composition according to claim 3, wherein the natural emulsifier is a natural extract containing saponins.

5. The composition according to claim 4, wherein the natural extract containing saponins is present in an amount from 0.01% to 1% by weight based on the total weight of the composition.

6. The composition according to claim 4, wherein saponins comprise a quillaja extract.

7. The composition according to claim 3, wherein the natural emulsifier is gum Arabic.

8. The composition according to claim 7, wherein the weight ratio between inulin and gum Arabic is between 50:50 and 95:5.

9. The composition according to claim 1, wherein the inulin is a chicory inulin.

10. The composition according to claim 1, wherein the flavor is a citrus flavor.

11. The composition according to claim 1, wherein the powdered composition is free from starch derivatives.

12. A consumer product selected from the group consisting of a powdered beverage, a sweet good, and a savory good, the consumer product comprising the composition as defined in claim 1.

13. The composition according to claim 9, wherein the chicory inulin is obtained by extraction of inulin from chicory root.

* * * * *